Nov. 1, 1966  A. G. GOLDBERG  3,282,604
SAFETY BAR FOR AUTOMOBILE SEATS
Filed Feb. 16, 1965  2 Sheets-Sheet 1
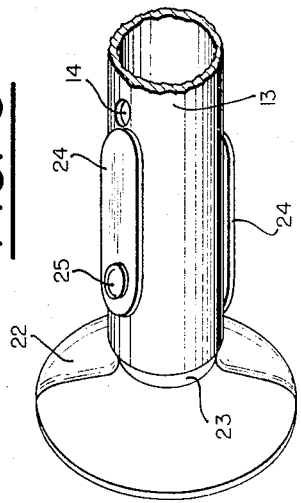
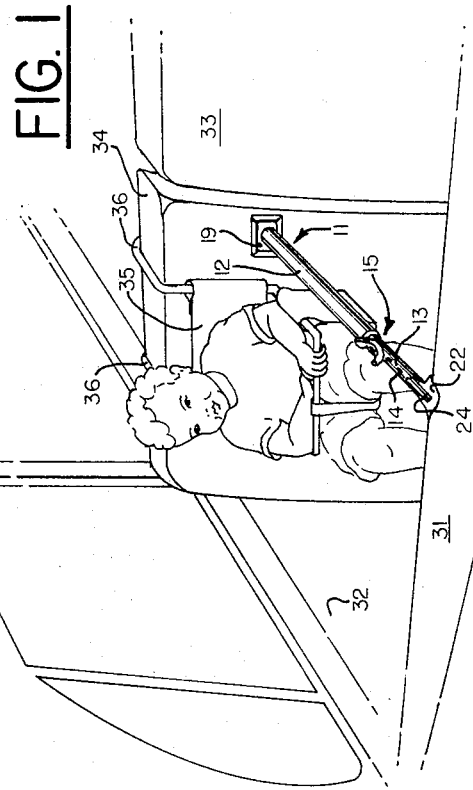
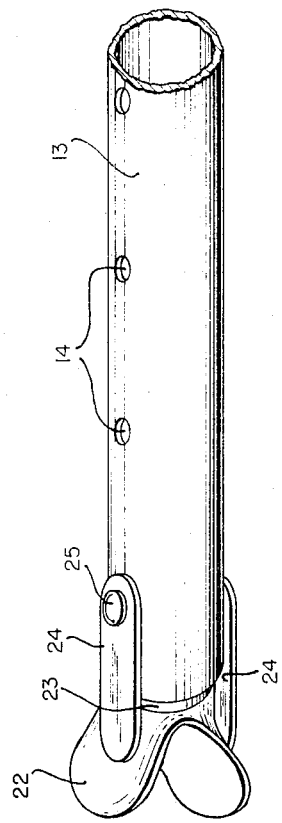
Abraham G. Goldberg, deceased
*Inventor*
by Morris I. Goldberg, *Executor*
by Porter + Meyer
*Attorneys*

Nov. 1, 1966  A. G. GOLDBERG  3,282,604
SAFETY BAR FOR AUTOMOBILE SEATS
Filed Feb. 16, 1965  2 Sheets-Sheet 2

Abraham G. Goldberg, deceased
*Inventor*
by Morris I. Goldberg, *Executor*
by Porter + Meyer
*Attorneys*

United States Patent Office 3,282,604
Patented Nov. 1, 1966

3,282,604
SAFETY BAR FOR AUTOMOBILE SEATS
Abraham G. Goldberg, deceased, late of Chestnut Hill, Mass., by Morris I. Goldberg, executor, Newton, Mass., assignor to International Manufacturing Company, Boston, Mass., a corporation of Massachusetts
Filed Feb. 16, 1965, Ser. No. 433,217
3 Claims. (Cl. 280—150)

This invention relates to a safety bar for use with automobile front seats of the split seat or bucket seat variety. More particularly it relates to an adjustable bar adapted to extend in an automobile between the cowl portion (i.e. the dashboard or instrument panel) and the back of the front seat at the passenger side for the purpose of keeping that portion of the back of the front seat from swinging forward especially when the automobile decelerates as when the brakes are applied.

It is customary to provide an auxiliary travel seat adapted to be affixed to the seat of an automobile for an infant or a small child to ride in. Most generally such auxiliary travel seats are provided with large hook-shaped members adapted to pass over the top of the automobile seat and to hold the auxiliary travel seat in place against the forward side of the back of the automobile seat.

The utility of auxiliary travel seats of this type is greatly diminished in the case of two door automobiles. Normally in a two door automobile, the back of the front seat is split into two parts, each of which is hingedly mounted to the base of the seat so that each portion can be displaced forwardly to provide access to the rear of the automobile. In some models, individual front seats are provided popularly called bucket seats where in each case the back portion of the seat folds forward.

Obviously, an auxiliary travel seat placed on the back of a seat that folds forward, will move forward with the back of that seat in the event that the back moves forward. Thus there is always the danger that if the automobile stops suddenly while a baby seat is in place on the passenger side of the front seat of a two door car, the infant will be propelled along with the seat into the dashboard or windshield should the car stop suddenly. For this reason, it has been necessary in the past, at least when there is no adult passenger to sit in the passenger side of the front seat, to mount such an auxiliary travel seat on the back of the rear seat of a two door car. This is obviously inconvenient where a mother and a small child are traveling alone in the automobile.

It is an object of this invention to provide an easily removable safety bar or brace to prevent the accidental or unintended movement of the rear portion of an automobile seat.

It is a further object of this invention to provide such a brace with means adapted to cooperate with both the dashboard or instrument panel and the back of said seat, and with length adjusting means to accommodate the brace to varying distances between the back of such seat and such dashboard or instrument panel.

It is a further object of this invention to provide the means adapted to cooperate with the dashboard or instrument panel with auxiliary shaping means adapted to enable said cooperating means to engage either a flat surface or a relatively rounded or pointed surface.

These and other objects of this invention will be more readily apparent from the following detailed description of the invention, and from the drawings, in which:

FIG. 1 is an overall perspective view showing the safety bar or brace in position in a typical automobile;

FIG. 6 is a perspective view showing in detail the cowl engaging means in one operative condition; and FIG. 7 is a perspective view showing in detail the cowl engaging means in alternative operative position.

Figure 2:
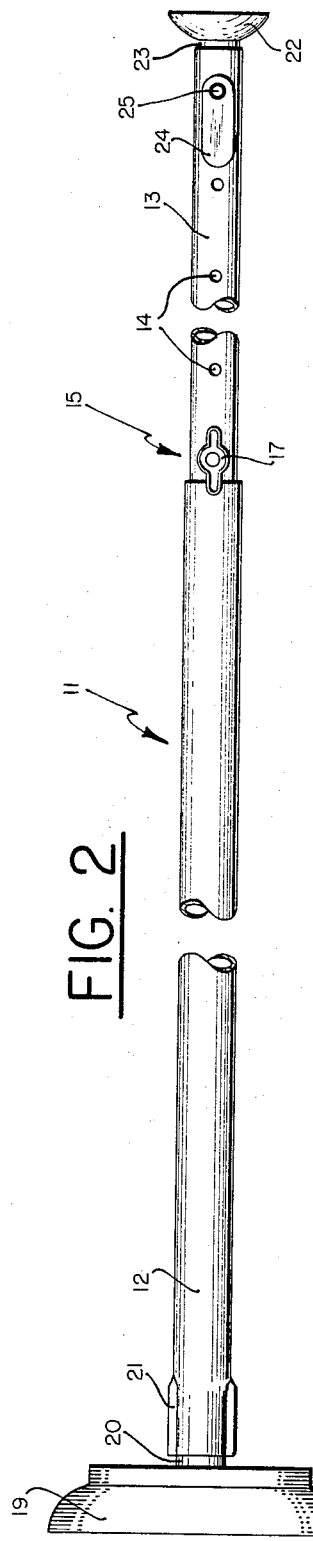
FIG. 2 is a side elevation of the safety brace of the present invention.
Figure 3:
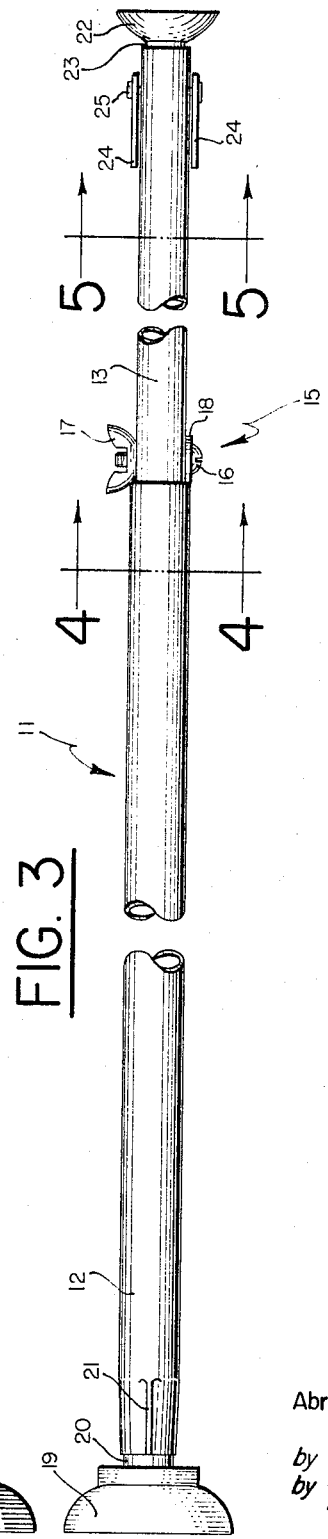
FIG. 3 is a top view of the safety brace of the present invention.
Figure 5:
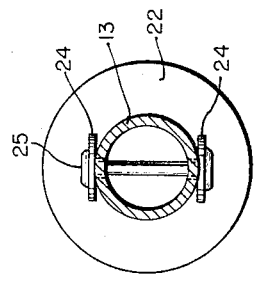
FIG. 5 is a cross-section corresponding to line 5—5 of FIG. 3.
Figure 4:
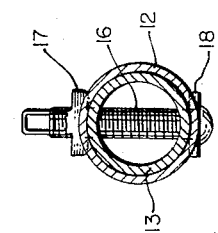
FIG. 4 is a cross-section corresponding to line 4—4 of FIG. 3.

The removable safety brace of the present invention indicated generally at 11 comprises two interfitting elongated tubular pieces 12 and 13. The inner diameter of outer tubular piece 12 is sufficiently larger than the outer diameter of inner tubular piece 13 that tube 13 will slide freely within tube 12.

Tube 13 is provided with spaced pairs of apertures 14, the apertures 14 in each pair being diametrically opposed across tube 13 from one another. Holding means 15 are provided adapted to pass through any such pair of apertures 14 and to extend beyond the outer limits of tube 13 on both sides sufficiently to engage the end of tube 12 and thereby limit the movement of tube 13 within tube 12. Conveniently holding means 15 comprise a bolt member 16 adapted to pass through both members of a pair of apertures 14 and a nut member 17 adapted to cooperate with bolt member 16. As shown nut member 17 is a wing nut. A washer 18 having the same outside diameter as nut member 17 may be provided adjacent the head of bolt member 16 to insure slight contact between holding member 15 and the end of tube 12.

A plurality of pairs of apertures 14 are provided along the length of tube 13 at convenient intervals for the optional reception of holding member 15. Since the presence of holding member 15 in a pair of apertures 14 limits the degree to which tube 13 can telescope within tube 12, a movement of holding member 15 from one such pair of apertures 14 to another such pair of apertures adjusts the overall minimum length of brace 11. Since the function of brace 11 is to prevent the rear of the seat from approaching the cowl it is not necessary to lock tube 13 firmly within tube 12 but only to limit the degree of telescoping. If, however, it were for some reason desired to lock tube 13 firmly into position relative to tube 12, this could be done readily by providing tube 12 with a pair of apertures (not shown) adapted to receive holding member 15 in such manner that holding member 15 would pass through apertures in tube 12 and tube 13.

The length of tube 12 and the positioning of the pair of apertures 14 in tube 13 are such as to adjust the overall length of brace 11 to correspond to that range of distances which separate the cowl from the front of the back section of the seat various standard models of automobiles to allow the range of adjustment of such seats in such automobiles. Tube 11 is provided long enough to receive tube 13 entirely within itself when brace 11 is adjusted to its shortest working length. Conversely tube 13 is provided long enough that a sufficient portion remains within tube 12 when brace 11 is adjusted to its longest working length to insure that brace 11 will remain stable.

In a typical brace 11 adapted for use in a wide variety of automobiles outer tube 12 is provided from ⅞ inch tubing and is approximately 25 inches long and an inner tube 13 is provided from ¾ inch tubing and is approximately 15 inches long. Seven pairs of paired apertures 14 are provided at substantially equal distances with the pair next to the outer end of tube 13 approximately 1¾ inch from the end of tube 13 and the pair furthest from the outer end of tube 13 located at approximately 10″ from that end.

The outer end of outer tube 12 is provided with a large rubber suction cup 19 adapted to rest against and provide a frictional grip with the back of an automobile seat.

The back of cup 19 is provided with an outwardly extending cylindrical projection 20 adapted to extend into and to be received by outer tube 12. The end of tube 12 may be suitably crimped as indicated at 21 to insure a tight frictional fit between the inner surface of tube 12 and the outer surface of projection 20. Preferably suction cup 19 is rectangular in shape. It has been found that such a cup having an overall dimension about 4½ inches long, 4½ inches wide and one inch deep is quite satisfactory.

The outer end of inner tube 13 is provided with a smaller round rubber suction cup 22 which is provided on its backside with an outwardly extending cylindrical projection 23 adapted to extend into and to be received frictionally by inner tube 13. A suction cup having a diameter of about 1½ inch has been found to be satisfactory in general use.

A pair of flip braces 24 are provided pivotally mounted near the end of tube 13 on pivot 25 in such manner as to optionally extend outwardly beyond the end of tube 13 and parallel thereto and optionally to extend inwardly along tube 13 with no portion projecting beyond the end thereof.

These alternative positions of flip braces 24 are shown in detail in FIGS. 6 and 7. When extended outwardly as shown in FIG. 7 the inner surfaces of braces 24 are adapted to engage the outer side of cup 22 and to deform the cup into a generally U-shaped member when viewed from the side. When so deformed cup 22 is particularly adapted to receive, to cooperate with and to grip securely curved member, such as the curved edge of an automobile dashboard. When braces 24 are extended inwardly as shown in FIG. 6 cup 22 assumes its normal configuration and is adapted to rest against a flat surface such as the face of an automobile instrument panel. In a safety brace having the dimensions disclosed it has been found that if the flip braces 24 extend about ½ inch beyond the end of tube 13 in their outwardly extended position, a suitable deformation of cup 22 occurs with a suitable degree of side reinforcement from the flip braces 24. Flip braces 24 are preferably formed of strips of sheet metal about 1⅜ inches and have the ends rounded to avoid the presence of sharp corners. Pivot 25 which passes through tube 13 is located near one end of each of the pair of flip braces 24.

The manner in which brace 11 of the present invention is intended to be used is shown in FIG. 1. In FIG. 1 the interior of an automobile is represented generally by cowl 31 and side 32. The automobile is provided with a split front seat represented by the back 33 of the driver's portion of the seat and the back 34 of the passenger's portion of the seat. A child is represented sitting in an infant's travel seat 35 which seat is suspended on the back 34 of the passenger's part of the seat by means of hook members 36 which pass over back 34.

Brace 11 is shown with small suction cup 22 deformed by flip braces 24 in their outwardly extending position in cooperating position over the relatively sharp edge of cowl 31 and with large cup 19 in contact with the forward side of seat back 34. The overall length of brace 11 is adjusted by positioning holding member 15 in the appropriate pair of apertures 14 so that brace 11 when cup member 19 is in firm contact with seat 34 extends generally horizontally. Since the back of seat 34 is normally if not universally tilted back slightly from the perpendicular, brace 11 may be readily installed merely by engaging cup 22 with the lip of cowl 31 and swinging cup member 19 downwardly until it engages firmly with seat 34. Brace 11 can be readily removed merely by lifting cup member 19 out of contact with seat 34. When in position brace 11 positively prevents any forward movement of the back of seat 34 and insures that the back of seat 34 will remain upright at all times.

What is claimed is:

1. A safety brace adapted to extend between the exposed portion of the cowl of an automobile and the front surface of the rear portion of the front seat thereof and to prevent the unintentional forward motion of said rear portion of said seat, said brace comprising a first hollow tubular member, a second tubular member, said second tubular member adapted to be positioned within said first tubular member, means associated with said second tubular member to limit the movement of said second tubular member within said first tubular member, a flexible member provided with a seat engaging portion positioned at the free end of said first tubular member and adapted to rest against said seat, a flexible distortable member provided with a normally flat cowl engaging portion positioned at the free end of said second tubular member and adapted to rest against said cowl, and means associated with said second tubular member and adapted optionally to engage the side of said flexible distortable means and when engaged to distort said member into a curved form adapted to cooperate with the curved portion of said cowl.

2. A safety brace as claimed in claim 1 wherein said flexible distortable means adapted to engage said cowl comprises a rubber cup member and wherein said means adapted to engage said flexible distortable means comprises a pair of arms pivotally mounted on said second tubular member and adapted to assume alternative positions wherein in one no portion of either said arm extends beyond the end of said members, and in the other wherein both said arms extend a substantial distance beyond the end of said second tubular member in position to engage the opposite sides of said distortable means.

3. A safety brace as claimed in claim 2 wherein said means associated with said second tubular member to limit the movement thereof comprises a plurality of paired apertures spaced at intervals along said second tubular member and means adapted to cooperate selectively with any of said paired apertures and to engage the end of said first tubular member.

References Cited by the Examiner
UNITED STATES PATENTS 2,664,140 12/1953 Kindelberger _____ 297—216 X
2,818,274 12/1957 Manos _____ 297—216 X BENJAMIN HERSH, *Primary Examiner.*

M. S. SALES, *Assistant Examiner.*